United States Patent
Bosworth et al.

(10) Patent No.: US 7,266,814 B2
(45) Date of Patent: Sep. 4, 2007

(54) NAMESPACE BASED FUNCTION INVOCATION

(75) Inventors: Adam Bosworth, Mercer Island, WA (US); David Bau, III, Gladwyne, PA (US); Kenneth Eric Vasilik, Redmond, WA (US)

(73) Assignee: BEA Systems, Inc., San Jose, CA (US)

( * ) Notice: Subject to any disclaimer, the term of this patent is extended or adjusted under 35 U.S.C. 154(b) by 659 days.

(21) Appl. No.: 10/089,197

(22) PCT Filed: Nov. 9, 2001

(86) PCT No.: PCT/US01/46712

§ 371 (c)(1),
(2), (4) Date: Apr. 28, 2003

(87) PCT Pub. No.: WO02/39274

PCT Pub. Date: May 16, 2002

(65) Prior Publication Data

US 2004/0031043 A1   Feb. 12, 2004

Related U.S. Application Data

(60) Provisional application No. 60/246,915, filed on Nov. 10, 2000.

(51) Int. Cl.
*G06F 9/45*   (2006.01)
(52) U.S. Cl. .................................................. 717/166
(58) Field of Classification Search ................ 717/166, 717/140
See application file for complete search history.

(56) References Cited

U.S. PATENT DOCUMENTS

| | | | |
|---|---|---|---|
| 5,930,512 | A | 7/1999 | Boden et al. |
| 6,066,181 | A | 5/2000 | DeMaster |
| 6,115,741 | A | 9/2000 | Domenikos et al. |
| 6,260,078 | B1 | 7/2001 | Fowlow |
| 6,308,224 | B1 | 10/2001 | Leymann et al. |
| 6,327,624 | B1 | 12/2001 | Mathewson, II et al. |
| 6,442,748 | B1 * | 8/2002 | Bowman-Amuah ......... 717/108 |
| 6,675,353 | B1 * | 1/2004 | Friedman .................... 715/513 |
| 6,678,724 | B2 * | 1/2004 | Nakajima et al. ........... 709/219 |
| 2002/0069399 | A1 * | 6/2002 | Miloushey et al. ......... 717/108 |
| 2004/0028049 | A1 * | 2/2004 | Wan .......................... 370/394 |

* cited by examiner

*Primary Examiner*—John Chavis
(74) *Attorney, Agent, or Firm*—Schwabe, Williamson & Wyatt, P.C.

(57) ABSTRACT

A data representation is read and parsed. A declaration referencing an executable namespace is recognized. An expression is recognized. A name (declared within the executable namespace) within the expression having zero or more additional data representations is also recognized. In response, functions corresponding to the name and additional data representations are recursively resolved, and caused to be invoked and executed, with the execution results of the inner functions successively provided for use in the execution of the outer functions. For each function, the function or a creator to create the function is instantiated. The instantiating is effectuated by following a path enumerated in the declaration for locating functions of the namespace. If a creator of the function is located and instantiated, the function is created using the function creator, and then the created function is instantiated. Upon instantiation, the referenced function is invoked and executed.

21 Claims, 5 Drawing Sheets

NAMESPACE BASED FUNCTION INVOCATION

RELATED APPLICATIONS

This non-provisional application is related to and claims priority to provisional application No. 60/246,915 entitled "A Data Processing Method Employing Cell Based Data Flow Description", filed on Nov. 10, 2000, which is hereby fully incorporated by reference.

BACKGROUND OF THE INVENTION

1. Field of the Invention

The present invention relates to the field of data processing. More specifically, the present invention relates to the employment of namespaces to facilitate local and remote function invocation.

2. Background Information

Ever since the invention of the first computer, computer scientists have continuously tried to improve the productivity of programmers, such that more applications can be developed with fewer resources to take advantage of the continuous advancements being made in the art of computer and related technologies. First assembler languages were developed to replace machine languages. Then, high level languages, such as FORTRAN, COBOL, PL/I and so forth, were developed to further improve the productivity of programmers. Development of high level languages were followed by structured languages such as Pascal and C, and then object oriented programming languages such as C++. To facilitate development of the Internet and the World Wide Web, "new" languages such as the Hypertext Markup Language (HTML), Java, Javascript, Perl and CGI were developed.

Most languages also support function calls, which may be user-defined functions or pre-packaged functions, such as those included with the languages' runtime libraries. However, in the earlier days, to be invocable, the functions must exist on the same system as the callers of the functions. Later on, to facilitate development of client-server computing, remote procedure call (RPC), a messaging protocol, was developed to facilitate a program executing on one computer to remotely invoke and access the service of a function on another computer. More recently, to facilitate development of web based applications, and employment of object oriented programming techniques, remote method invocation (RMI) was developed to facilitate interacting with objects on a server.

With the advance of public networks, such as the Internet, numerous function resources exist in different parts of the networks, written in different languages on different platforms. It is desirable to be able to invoke these function resources, regardless of their location, host language or host platform without limitation to the relationship between the invoking computing device and the function hosting computing device. Thus, an approach that can efficiently realize this potential is desired.

SUMMARY OF THE INVENTION

A data processing representation is read and parsed. A namespace declaration is recognized and identified as "executable." An expression is recognized. A name (declared within the executable namespace) within the expression having zero or more additional data representations is also recognized. In response, functions corresponding to the name and additional data representations are recursively resolved, and caused to be invoked and executed, with the execution results of the inner functions successively provided for use in the execution of the outer functions.

For each function, the function or a creator to create the function is located and instantiated based on the namespace and the name. In one embodiment, the declaration includes a URI to help locate functions. If a creator of the function is located and instantiated, the function is created using the function creator, and then the created function is instantiated. Upon instantiation of the referenced function, the function is executed.

In one embodiment, an execution engine is provided to effectuate the namespace based-function invocation. For the embodiment, the execution engine first looks for loadable Java class, thereafter a compilable Java resource, next, an XSLT style sheet and finally, a Java class factory. Further, for the embodiment, if the function is resolved to be a remote function, the execution engine creates a local proxy, causing the function to be remotely invoked and executed, passing the remote function with invocation parameters, where applicable.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

The present invention includes namespace based invocation of local or remote functions. In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, values, tags, references, and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

Overview

Figure 1:
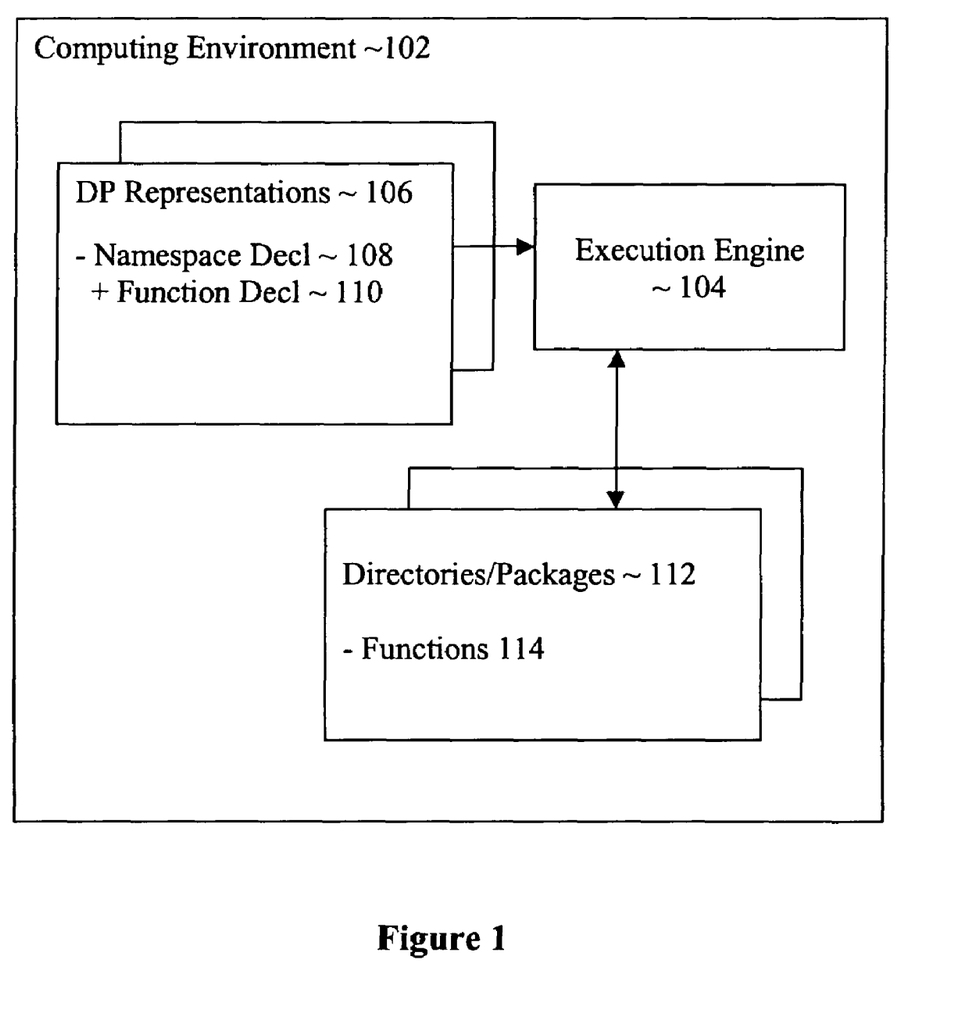
FIG. 1 illustrates an overview of the namespace based function invocation the present invention, in accordance with one embodiment.

Referring now to FIG. 1, wherein a block diagram illustrating an overview of the namespace based function invocation of the present invention, in accordance with one embodiment. As illustrated, in accordance with the present invention, a computing environment 102 is provided with an execution engine 104 equipped to recognize, construct, and effectuate invocation references in a data representation 106 to one or more local or remote functions 114. As will be described in more details below, locations 112 of functions 114 are resolved by their affiliations to qualified names 110 declared in namespaces 108, which may be local or remote. As a result, function invocation is advantageously streamlined.

In general, except for the teachings of the present invention incorporated in execution engine 104, and the exploitation of these abilities to process data representations 106, data representations 106 are intended to represent a broad range of data representation methodologies known in the art, and execution engine 104 is intended to represent a broad range of the corresponding engines in support of these methodologies. Typically, each execution engine 104 is designed to support a particular manner of representing data or a particular programming language, although in different embodiments, execution engine 104 may support multiple data representation methodologies/programming languages. Similarly, except for the ability of execution engine 104 being able to invoke functions 114 affiliated with qualified names 110 declared in namespaces 108, functions 114 and their locations 112 are also intended to represent a broad range of these elements known in the art.

Further, computing environment 102 may be disposed in a single or multi-processor system, or a collection of networked systems. In the case of networked systems, the systems may be networked locally, or across a number of private and/or public networks, including the Internet.

The manner in which data representations 106 reference functions 114 affiliated with qualified names 110 declared in namespaces 108, and the manner in which engine 104 recognizes, constructs and effectuates these invocations will be described in turn below.

Invocation of Functions Affiliated with Namespaces

In one embodiment, the present invention contemplates that a data representation 106 would associate a qualified name 110 with a function 114 by first declaring a namespace as "executable", using a specially formed URI, with e.g. the following syntax <math add xmlns:math="x://bestuniversity.edu/mathdept/mathlibr/"> where "xmlns" specifies an XML namespace is being declared

"math" is the prefix of the XML namespace, used to qualify names in this namespace.

"x://bestuniversity.edu/mathdept/mathlibr/" is a the unique name of the namespace.

"x:" is a special URI scheme recognized by the corresponding execution engine as identifying the XML namespace (associated with the prefix "math") being declared as executable, and "bestuniversity.edu" is the URI authority or hostname and "/mathdep/mathlibr/" is a relative path. These are used to locate the functions associated with the qualified names in the XML namespace being declared.

"math:add" is a qualified name indicating "add" is the name of a function within the executable namespace "x://bestuniversity.edu/mathdept/mathlibr/".

The present invention further contemplates that the execution engine 104 would then process each data representation 106 associated with (e.g., nested within) the qualified name 110 recursively, concatenate the results together in order of occurrence, pass the concatenated results to a function 114 affiliated with the qualified name 110 and replace the qualified name with the result returned by the function, with e.g. the following syntax <math:squareroot xmlns:math="x://bestuniversity.edu/mathdep/mathlibr/">
  <math:add>
    <math:square>4</math:square>
    <math:square>3</math:square>
  </math:add>
</math:squareroot>

By virtue of the namespace prefix "math", the names "squareroot" "add" and "square" are interpreted as references to a "squareroot", an "add" and a "square" function within namespace "x://bestuniversity.edu/mathdept/mathlibr/". Together, the statements operate to "square" the values 3 and 4, add the results together, and then generate the square root of the sum (i.e., 5), using the "squareroot", "add" and "square" functions associated with the qualified names in the declared namespace. Thus, math functions (or other functions of the like) available on the network from various third parties, may be easily invocable following the described approach.

Execution Engine

Figure 2A:
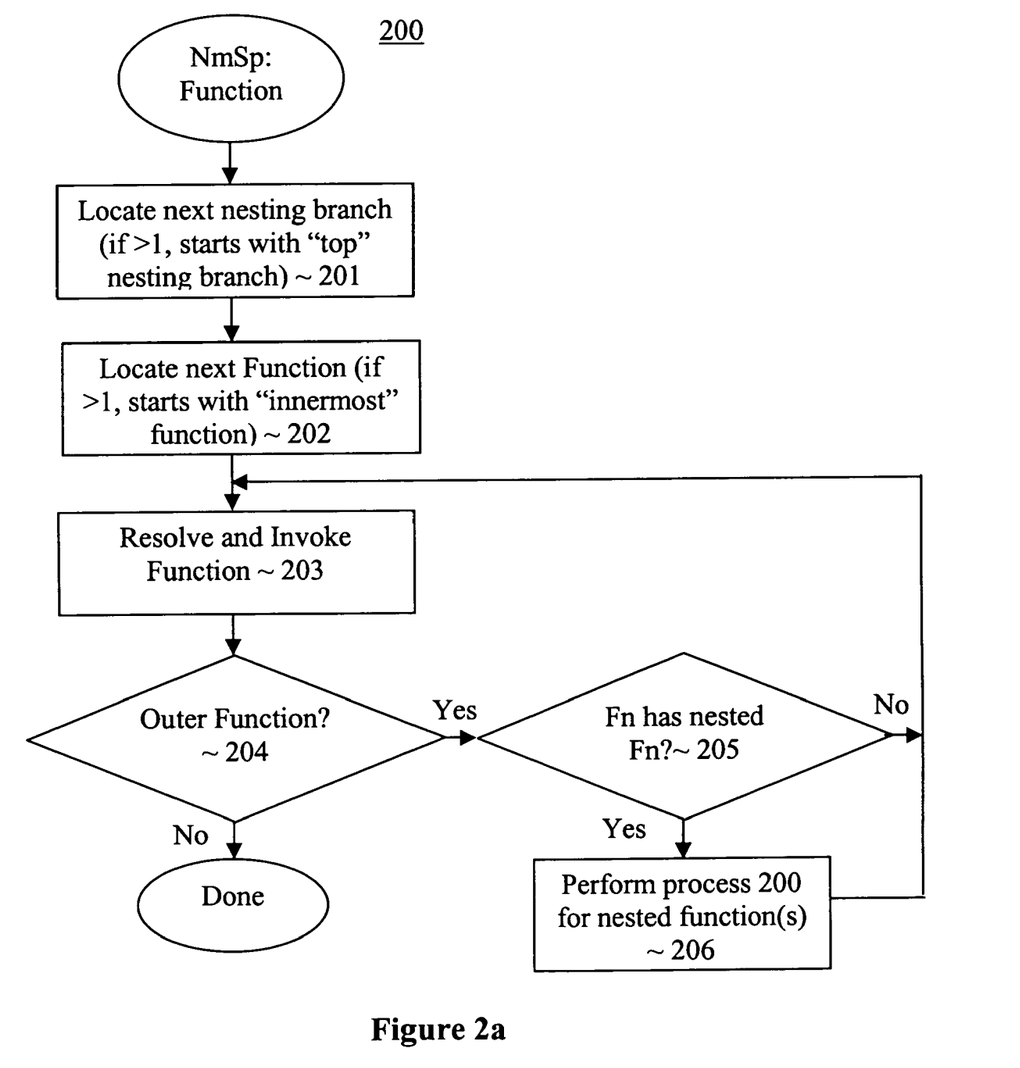
FIGS. 2a-2c illustrate the relevant operational flow of the execution engine of FIG. 1, in accordance with one embodiment.
Figure 2B:
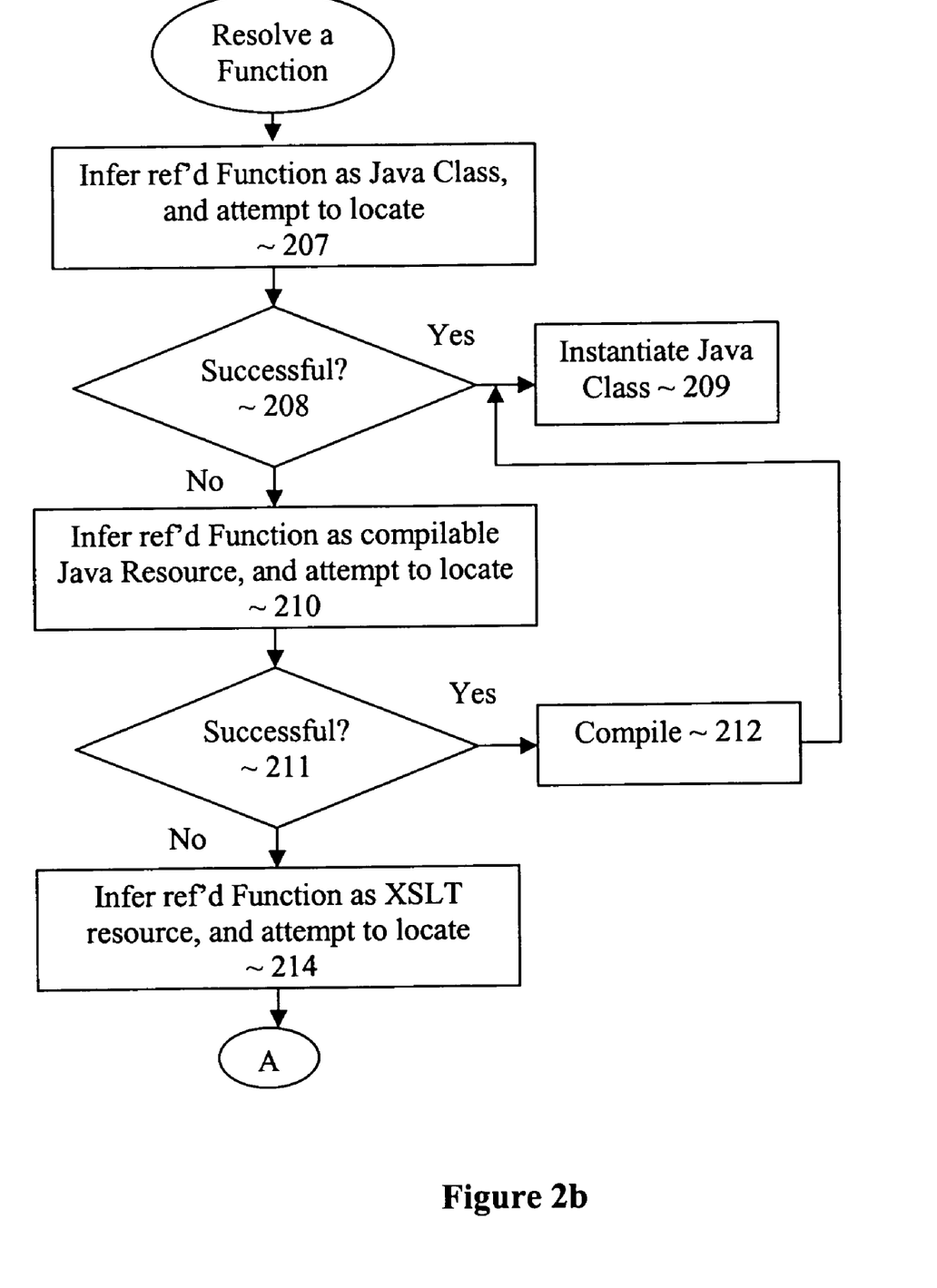
Figure 2C:
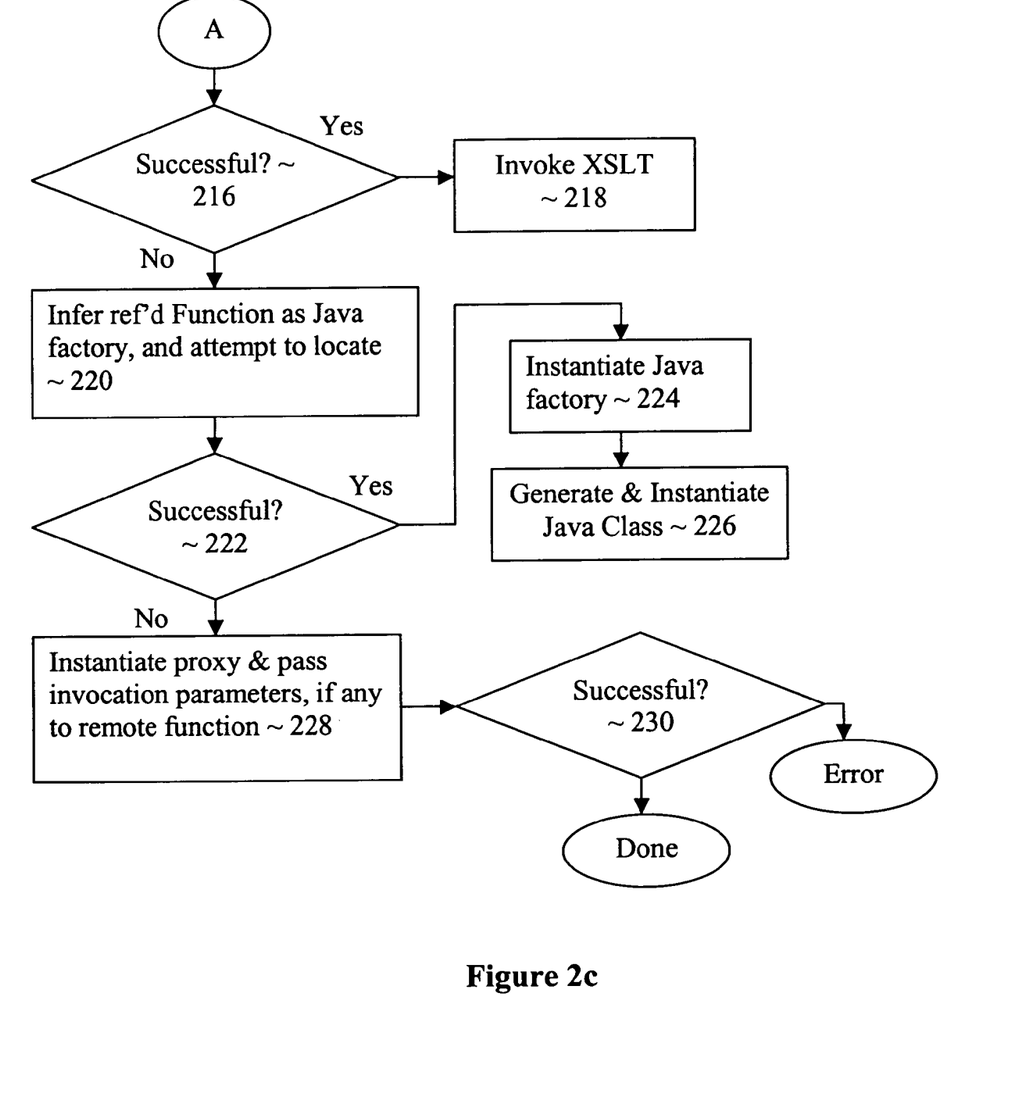

FIGS. 2a-2c illustrate the operational flow of the relevant aspects of execution engine 104 in accordance with one embodiment. More specifically, FIG. 2a illustrates the general operational flow of execution engine 104 for handling an invocation of a function, and FIG. 2b-2c illustrate the operation flow of execution engine 104 in resolving each of the nested functions (if any) within the function, and the function itself, being invoked. Recall from earlier description, the function, including each of the nested functions (if any), is affiliated with a qualified name 110 declared in a namespace 108. Further, the embodiment, assumes, execution engine 104, like other conventional execution engines of prior art data representations, upon invocation, would parse and interpret the statements of data representation 106. Thus, as illustrated in FIG. 2a, for the embodiment, upon encountering an expression referencing a function with zero or more nested functions, execution engine 104 first locates a first "branch" with nested function(s), starting with the "topmost branch", block 201. (Note that usage of the term "branch" and "topmost" are merely referential with respect to a "horizontal" view of the nesting structure, i.e. A→B→C, for ease of understanding). Next, execution engine 104 locates the innermost function along the selected branch within the function being invoked, block 202. Naturally, if the there is no nested function within the function being invoked, the function itself is considered the innermost function located on the topmost branch. Upon locating the innermost function, execution engine 104 resolves the location of the function, and causes the function to be invoked and executed, block 203.

Then, execution engine 104 determines if there is another outer function, block 204. If so, execution engine 104 further determines if the function has other nested functions along other branches, block 205. If not, the process continues back at block 203, with execution engine 104 resolving and invoking the next outer function, passing the execution result of the previous invoked function(s) to the next outer function being invoked.

Back at block 205, if the function is determined to have additional nested functions along other "lower" branches, execution engine 104 recursively perform process 200 until all nested functions along these "lower" branches have been recursively invoked and executed, block 206.

The process continues as earlier described until the outermost function has also been resolved and invoked. At such time, the recursively generated execution result becomes the final execution result.

FIGS. 2b-2c illustrate the manner in which execution engine 104 resolves a function affiliated with a qualified name prefix:name. As illustrated, execution engine 104 would first search for an invocable Java Class based on the declared namespace, and attempt to load and instantiate the referenced Java Class, block 204. In the above example, execution engine 104 would use the qualified name and URI included in the namespace declaration, and construct a fully qualified name for the assumed Java Class, e.g. in the case of the "squareroot" function, "edu.bestuniversity.mathedept, mathlibr.squareroot", and attempt to load the Java Class from a classpath derived from the URI.

At block 205, execution engine 104 would determine if the attempt loading was successful or e.g. an error code was returned. If the loading attempt was successful, execution engine 104 would instantiate the so loaded Java Class, block 206, and execute the function accordingly. If not, for the embodiment, execution engine 104 would next infer the reference as a reference to a compilable Java resource based on the declared namespace, and attempt to retrieve the referenced Java resource for compilation, block 208. In the above example, execution engine 104 would use the qualified name and URI included in the namespace declaration, and construct a path name for the assumed Java resource, e.g. in the case of the "squareroot" function, "/mathedept/mathlibr/squareroot.java", and attempt to retrieve the compilable Java resource from a search path derived from the URI.

As before, at block 210, execution engine 104 would determine if the attempt retrieval was successful or e.g. an error code was returned. If the retrieval attempt was successful, execution engine 104 would compile the retrieved Java resource, block 212, and instantiate the compiled code, block 206. Thereafter, the function is executed accordingly. If not, for the embodiment, execution engine 104 would next infer the reference as a reference to an Extensible Stylesheet Language Transformation (XSLT) based on the declared namespace, and attempt to retrieve the referenced XSLT sheet, block 214. In the above example, execution engine 104 would use the qualified name and URI included in the namespace declaration, and construct a path name for the assumed XSLT sheet, e.g. in the case of the "squareroot" function, "/mathedept/mathlibr/squareroot.xslt", and attempt to retrieve the XSLT sheet from a search path derived from the URI.

At block 216, execution engine 104 would determine if the attempt retrieval was successful or e.g. an error code was returned. If the retrieval attempt was successful, execution engine 104 would invoke the retrieved XSLT sheet, block 218, and execute the function accordingly. If not, for the embodiment, execution engine 104 would next infer the reference as a reference to a Java Factory, and attempt to retrieve the referenced Java Factory, block 220. In the above example, execution engine 104 would use the qualified name and URI included in the namespace declaration, and construct a fully qualified name for the assumed Java class factory, e.g. in the case of the "squareroot" function, "edu.bestuniversity.mathedept.mathlibrFactory", and attempt to retrieve the Java class factory from a class path derived from the URI.

Again, at block 222, execution engine 104 would determine if the retrieval attempt was successful or e.g. an error code was returned. If the retrieval attempt was successful, execution engine 104 would instantiate the Java class factory, block 224, and generate the Java Class using the instantiated Java class factory accordingly, block 226. Thereafter, the referenced function would be executed accordingly.

If not, for the embodiment, execution engine 104 would next infer the reference as a reference to a remote function. Accordingly, execution engine 104 creates a local proxy, and attempts to call the function remotely, including passing any applicable invocation parameters to the remote function, if applicable, block 230. In the above example, execution engine 104 would use the URI included in the namespace declaration, to create a local proxy function for invoking the remote function, e.g. in the case of the "squareroot" function, a proxy function would be created to send the entire <math:squareroot> element to "bestuniversity.edu/mathedept/mathlibr" for remote evaluation (e.g., using HTTP POST), and return the remote response as the proxy function result. Thereafter, the referenced proxy function would be executed accordingly.

While for ease of understanding, the above description has enumerated only Java class, XSLT sheets, Java factory, and so forth, the present invention is not so limited. The present invention may be practiced with more or less programming methodologies/languages, including but not limited to JavaScript, XML files, Xsheets, and so forth. Xsheet is a cell based data processing methodology, which is the subject matter of U.S. patent application Ser. No. 09/741,219, entitled "Cell Based Data Processing", filed on Dec. 19, 2000, which is a non-provisional application of the earlier enumerated U.S. provisional patent application 60/246,915. Readers are referred to the '219 application for further details.

Accordingly functions written in a variety of languages, on a variety of host platforms, located at different locations of interconnected networks may be remotely invoked, based on their affiliation to namespaces, making it a lot easier for their access and invocation, as compared to prior art approaches.

EXAMPLE COMPUTER SYSTEM

Figure 3:
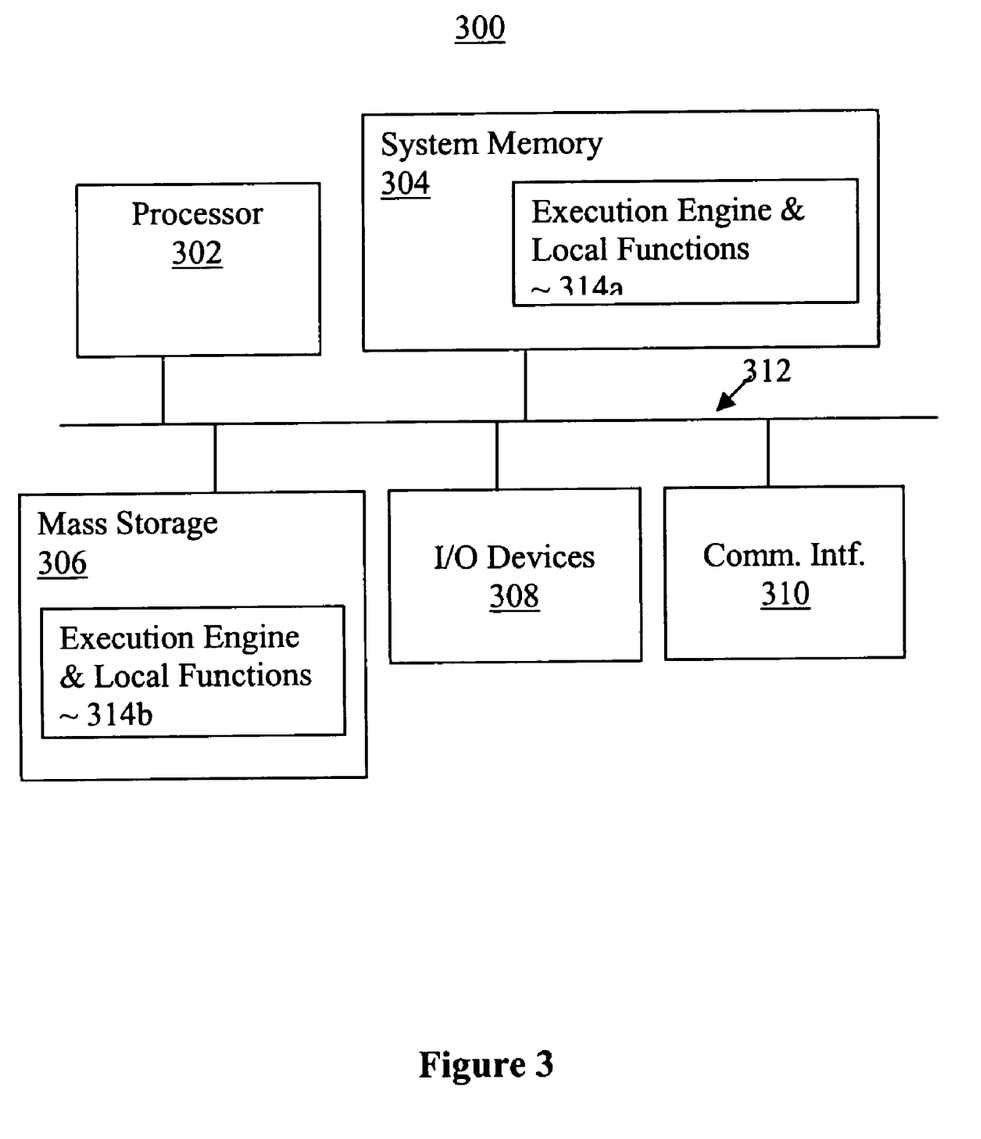
FIG. 3 illustrates a computer system suitable for use to practice the present invention, in accordance with one embodiment.

FIG. 3 illustrates a computer system suitable for use to practice the present invention, in accordance with one embodiment. As shown, computer system 300 includes one or more processors 302 and system memory 304. Additionally, computer system 300 includes mass storage devices 306 (such as diskette, hard drive, CDROM and so forth), input/output devices 308 (such as keyboard, cursor control and so forth) and communication interfaces 310 (such as network interface cards, modems and so forth). The elements are coupled to each other via system bus 312, which represents one or more buses. In the case of multiple buses, they are bridged by one or more bus bridges (not shown). Each of these elements performs its conventional functions known in the art. In particular, system memory 304 and mass storage 306 are employed to store a working copy and a permanent copy of the programming instructions implementing the execution engine with the namespace based function invocation support. The permanent copy of the programming instructions may be loaded into mass storage 306 in the factory, or in the field, as described earlier, through a distribution medium (not shown) or through communication interface 310 (from a distribution server (not shown). The constitution of these elements 302-312 are known, and accordingly will not be further described.

CONCLUSION AND EPILOGUE

Thus, it can be seen from the above descriptions, a novel method and apparatus for effectuating function invocation has been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method comprising:

reading and parsing, by a computer system, a data processing representation, the data processing representation including a declaration reference to an executable namespace and an expression referencing a function of the executable namespace;

recognizing, by the computer system, the declaration reference and the expression;

instantiating, by the computer system, the referenced function or a function creator to create the function, then instantiate the created function; and evaluating, by the computer system, the expression using the instantiated function.

2. The method of claim 1, wherein said declaration includes a path in said executable namespace to be followed to locate functions of the executable namespace; and said instantiation comprises following said path to locate said referenced function or the function creator of the referenced function.

3. The method of claim 2, wherein said instantiating comprises determining if a loadable Java class exists under a fully qualified name formed with said path and said referenced function; and if the loadable Java class exists under the fully qualified name, instantiating said loadable Java class following said path.

4. The method of claim 2, wherein said instantiating comprises determining if a loadable resource exists under a class path formed with said path said referenced function, and a class name; and if the loadable resource exists under the class path, retrieving said loadable resource following said path, compiling said retrieved resource, and instantiating said compiled resource.

5. The method of claim 2, wherein said instantiating comprises determining if a loadable XSLT style sheet exists under a class path formed with said path said referenced function, and an XSLT style sheet extension; and if the loadable resource exists under the class path, retrieving said loadable XSLT style sheet following said class path, and calling said XSLT style sheet as a function section.

6. The method of claim 2, wherein said instantiating comprises determining if a loadable resource exists under a class path formed with said path and a function creator name of said function; and if the loadable resource exists under the class path, retrieving said loadable resource following said path, creating said function using said loadable resource, and instantiating said created function.

7. The method of claim 1, wherein said instantiating comprises first determining if a loadable Java class corresponding to the referenced function exists, and if not, whether a compilable resource corresponding to the referenced function exists.

8. The method of claim 1, wherein said instantiating comprises first determining if a Java resource corresponding to the referenced function in executable or compilable exists, and if not whether an XSLT style sheet resource corresponding to the referenced function exists.

9. The method of claim 1, wherein said instantiating comprises first determining if an XSLT style sheet corresponding to the referenced function resource exists, and if not whether a Java class factory corresponding to the referenced function exists.

10. The method of claim 1, wherein said method further comprises recognizing at least one other function nested within said referenced function of the expression, and said evaluation comprises recursively invoking and instantiating the nested functions.

11. An apparatus comprising:

at least one storage unit having stored thereon programming instructions designed to read and parse a data processing representation, the data processing representation including a declaration reference to an executable namespace and an expression referencing a function of the executable namespace;

recognize the declaration reference and the expression;

instantiate the referenced function or a function creator to create the function, then instantiate the created function; and evaluate the expression using the instantiated function; and at least one processor coupled to said at least one storage unit to execute said programming instructions.

12. The apparatus of claim 11, wherein said programming instructions are designed to recognize said declaration having including a path in said executable namespace to be followed to locate functions of the executable namespace; and to effectuate said instantiation by following said path to locate said referenced function or the function creator of the referenced function.

13. The apparatus of claim 12, wherein said programming instructions are designed to determine if a loadable Java class exists under a fully qualified name formed with said path and said referenced function, and if the loadable Java class exists under the fully qualified name, instantiate said loadable Java class following said path.

14. The apparatus of claim 12, wherein said programming instructions are designed to
    determine if a loadable resource exists under a class path formed with said path said referenced function, and a class name, and
    if the loadable resource exists under the class path, retrieve said loadable resource following said path, compile said retrieved resource, and instantiate said compiled resource.

15. The apparatus of claim 12, wherein said programming instructions are designed to
    determine if a loadable XSLT style sheet exists under a class path formed with said path said referenced function, and an XSLT style sheet extension, and
    if the loadable resource exists under the class path, retrieve said loadable XSLT style sheet following said class path, and call said XSLT style sheet as a function section.

16. The apparatus of claim 12, wherein said programming instructions are designed to
    determine if a loadable resource exists under a class path formed with said path and a function creator name of said function, and
    if the loadable resource exists under the class path, retrieve said loadable resource following said path, create said function using said loadable resource, and instantiate said created function.

17. The apparatus of claim 11, wherein said programming instructions are designed to effectuate said instantiation by first determining if a loadable Java class corresponding to the referenced function exists, and if not, whether a compilable resource corresponding to the referenced function exists.

18. The apparatus of claim 11, wherein said programming instructions are designed to effectuate said instantiation by first determining if a Java resource corresponding to the referenced function in executable or compilable exists, and if not whether an XSLT style sheet resource corresponding to the referenced function exists.

19. The apparatus of claim 11, wherein said programming instructions are designed to effectuate said instantiation by first determining if an XSLT style sheet resource corresponding to the referenced function exists, and if not whether a Java class factory corresponding to the referenced function exists.

20. The apparatus of claim 11, wherein said programming instructions are further designed to recognize one or more functions nested within said referenced function of the expression, and recursively invoke and instantiate the nested functions.

21. An apparatus including a processor comprising:
    means for reading and parsing a data processing representation, the data processing representation including a declaration reference to an executable namespace, and an expression referencing a function of the executable namespace;
    means for recognizing a declaration reference and the expression;
    means for instantiating, following said path, the referenced function or a function creator to create the function, then instantiate the created function; and
    means for evaluating the expression using the instantiated function.

* * * * *